United States Patent Office 2,798,791
Patented July 9, 1957

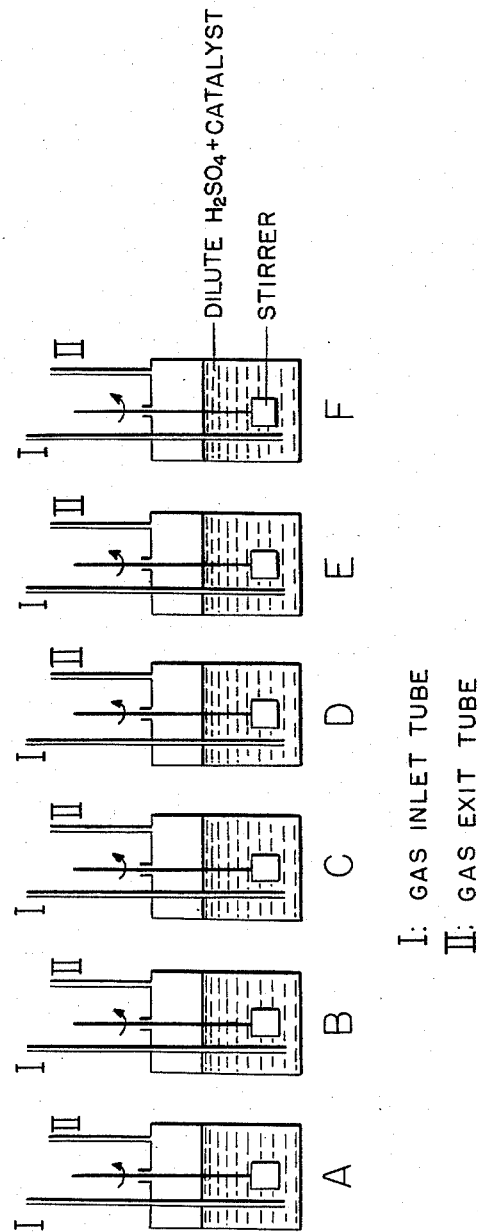

2,798,791
PRODUCTION OF HYDROXYLAMMONIUM SULFATE

Kurt Jockers, Hermann Meier, and Karl Wintersberger, Ludwigshafen (Rhine), Germany, assignors to Badische Anilin- & Soda-Fabrik Aktiengesellschaft, Ludwigshafen (Rhine), Germany Application January 25, 1954, Serial No. 405,808

Claims priority, application Germany January 23, 1953

8 Claims. (Cl. 23—117)

This invention relates to the production of hydroxylammonium sulfate by the catalytic reduction of nitric oxide with hydrogen in dilute sulfuric acid.

Prior to this invention it has already been known that hydroxylammonium salts can be made by the reduction of nitric oxide with hydrogen in an acid medium with the use of platinum catalysts. If dilute sulfuric acid is used as the acid medium, the platinum catalysts lose their activity so rapidly that it is not economical to produce hydroxylammonium sulfate by this method.

We have now found that this is the object of our invention that the lifetime of the catalysts in dilute sulfuric acid can be substantially increased by pretreating the sulfuric acid with oxidizing agents. Examples of oxidizing agents especially adapted for use in the practice of our invention are hydrogen peroxide and other peroxy compounds, such as sodium peroxide, alkali persulfates, Caro's acid, alkali metal percarbonates and alkali metal perborates. Other oxidizing agents, such as potassium permanganate and nitric acid, are also applicable to advantage for the said pretreatment of sulfuric acid. Favorable results may also be achieved with weaker oxidizing agents, as for example salts of nitrous acid.

In the practice of our invention the sulfuric acid is used in a dilute state. Principally speaking it is immaterial for oxidizing pretreatment of the sulfuric acid whether this be treated in a concentrated form or whether the oxidizing agents be added to the sulfuric acid after its dilution. For reasons inherent in the apparatus required, the oxidizing pretreatment is best achieved at ambient temperature in a stirring vessel. The sulfuric acid is ready for use one hour after the addition of the oxidizing agent.

The oxidizing agents are needed in very small quantities only. Using a slight excess thereof will do no harm, as any excess will be fast destroyed by hydrogen on the platinum catalyst during the hydrogenation of the nitric oxide. The quantity of oxidizing agents added per each liter of concentrated sulfuric acid shall be about equal to the oxidizing power of from 0.02 to 0.1 of an oxygen equivalent.

In many cases a pretreatment of the sulfuric acid with oxidizing gases, as for example gases containing oxygen, such as air, will do. The preferred technique in this case will be to blow air through concentrated sulfuric acid at a raised temperature, say 50° to 80° C. When air is used as an oxidizing agent, the time of treatment will be longer than with any of the oxidizing agents listed above and may be extended to about 10 hours.

The essence of our invention and its embodiment will now be described more fully by the way of the following Example and the drawing.

Referring to the drawing we use six stirrer-fitted containers A, B, C, D, E, and F of equal construction and capacity which all are charged with four liters each of a suspension of 25 grams of a catalyst containing 4 percent by weight of platinum in 3.5 n sulfuric acid, and fed per hour with a mixture of 36 liters N. T. P. of nitric oxide and 68.5 liters N. T. P. of hydrogen under equal conditions at 45° C. and atmospheric pressure. The sulfuric acid used in container A was not pretreated, while the sulfuric acid used in containers B to F was subjected to an oxidizing pretreatment in the following manner: The acid of container B, after having been diluted with water, was pretreated with 80 cc. of 3 percent hydrogen peroxide per each liter of concentrated acid; the acid of container C was pretreated with 5 grams of nitric acid of 68 percent strength per each liter of concentrated sulfuric acid; the acid of container D was pretreated with 1.6 grams of potassium permanganate per each liter of concentrated sulfuric acid; the acid of container E was pretreated with 6 grams of ammonium persulfate per each liter of concentrated sulfuric acid, all at a temperature of 22° C. and for 60 minutes and only then filled in the containers B to E. Through the acid filled in container F air was blown at a moderate speed for 12 hours at 60° C. before dilution. After six hours' stirring the acid was stripped from the catalyst and fresh acid was charged into each of the containers A to F, to wit nontreated acid into container A and acid pretreated as aforesaid into containers B to F. This renewal of acid was repeated five times, when the activity of the catalyst was determined. The data found show that it had dropped to 24 percent of the initial activity in container A determined by the drop in conversion of nitric oxide which in the beginning was 42.6 grams of NO for each gram of platinum per hour, whereas the activity had remained constant in container B and had dropped to 87 percent in container C, to 94 percent in container D, to 98 percent in container E, and to 72 percent in container F.

We claim:

1. In a process for the production of a hydroxylammonium sulfate by catalytic reduction of nitric oxide with hydrogen on a platinum-containing catalyst in dilute sulfuric acid, the improved step which comprises subjecting the sulfuric acid to an oxidizing pretreatment by addition of an oxidizing agent in an amount sufficient to increase the life of said platinum-containing catalyst.

2. In a process for the production of a hydroxylammonium sulfate by catalytic reduction of nitric oxide with hydrogen on a platinum-containing catalyst in dilute sulfuric acid, the improved step which comprises subjecting the sulfuric acid to an oxidizing pretreatment by blowing an oxygen-containing gas through concentrated sulfuric acid at a superatmospheric temperature and for a period of time sufficient to add at least 0.02 oxygen equivalents per liter of said concentrated sulfuric acid and sufficient to increase the life of said platinum-containing catalyst.

3. In a process for the production of a hydroxylammonium sulfate by catalytic reduction of nitric oxide with hydrogen on a platinum-containing catalyst in dilute sulfuric acid, the improved step which comprises subjecting the sulfuric acid to an oxidizing pretreatment by blowing air through concentrated sulfuric acid at a superatmospheric temperature and for a period of time sufficient to add at least 0.02 oxygen equivalents per liter of said concentrated sulfuric acid and sufficient to increase the life of said platinum-containing catalyst.

4. In a process for the production of a hydroxylammonium sulfate by catalytic reduction of nitric oxide with hydrogen on a platinum-containing catalyst in dilute sulfuric acid, the improved step which comprises subjecting the sulfuric acid to an oxidizing pretreatment by addition of an oxidizing agent selected from the group consisting of hydrogen peroxide, sodium peroxide, alkali metal persulfates, alkali metal percarbonates, alkali metal perborates, persulfuric acid, potassium permanganate, and nitric acid in an amount equal to the oxidizing power of at least 0.02 of an oxygen equivalent per liter of a concentrated sulfuric acid, said amount being sufficient to increase the life of said platinum-containing catalyst.

5. In a process for the production of a hydroxylammonium sulfate by catalytic reduction of nitric oxide with hydrogen on a platinum-containing catalyst in dilute sulfuric acid, the improved step which comprises subjecting the sulfuric acid to an oxidizing pretreatment by addition of an oxidizing agent selected from the group consisting of hydrogen peroxide, sodium peroxide, alkali metal persulfates, alkali metal percarbonates, alkali metal perborates, persulfuric acid, potassium permanganate, and nitric acid in an amount sufficient to increase the life of said platinum-containing catalyst.

6. In a process for the production of a hydroxylammonium sulfate by catalytic reduction of nitric oxide with hydrogen on a platinum-containing catalyst in dilute sulfuric acid, the improved step which comprises subjecting the sulfuric acid to an oxidizing pretreatment by addition of hydrogen peroxide in an amount sufficient to increase the life of said platinum-containing catalyst.

7. In a process for the production of a hydroxylammonium sulfate by catalytic reduction of nitric oxide with hydrogen on a platinum-containing catalyst in dilute sulfuric acid, the improved step which comprises subjecting the sulfuric acid to an oxidizing pretreatment by addition of an alkali persulfate in an amount sufficient to increase the life of said platinum-containing catalyst.

8. In a process for the production of a hydroxylammonium sulfate by catalytic reduction of nitric oxide with hydrogen on a platinum-containing catalyst in dilute sulfuric acid, the improved step which comprises subjecting the sulfuric acid to an oxidizing pretreatment by addition of potassium permanganate in an amount sufficient to increase the life of said platinum-containing catalyst.

References Cited in the file of this patent

UNITED STATES PATENTS

| 727,025 | Tafel | May 5, 1903 |
| 2,628,889 | Benson | Feb. 17, 1953 |

OTHER REFERENCES

J. W. Mellor's "A comprehensive Treatise on Inorganic And Theoretical Chem.," vol. 10, 1930 ed., page 433.